United States Patent
Ryan et al.

(10) Patent No.: US 9,406,313 B2
(45) Date of Patent: Aug. 2, 2016

(54) ADAPTIVE MICROPHONE SAMPLING RATE TECHNIQUES

(71) Applicant: Intel Corporation, Santa Clara, CA (US)

(72) Inventors: Joseph F. Ryan, Hillsboro, OR (US); James W. Tschanz, Portland, OR (US); Willem M. Beltman, West Linn, OR (US)

(73) Assignee: Intel Corporation, Santa Clara, CA (US)

( * ) Notice: Subject to any disclaimer, the term of this patent is extended or adjusted under 35 U.S.C. 154(b) by 96 days.

(21) Appl. No.: 14/222,284

(22) Filed: Mar. 21, 2014

(65) Prior Publication Data

US 2015/0269954 A1 Sep. 24, 2015

(51) Int. Cl.
*G10L 25/78* (2013.01)
*H04R 3/00* (2006.01)
*G10L 15/28* (2013.01)
*G10L 25/48* (2013.01)
*H04R 29/00* (2006.01)
*G10L 25/24* (2013.01)

(52) U.S. Cl.
CPC .............. *G10L 25/78* (2013.01); *G10L 15/28* (2013.01); *G10L 25/48* (2013.01); *H04R 3/00* (2013.01); *G10L 25/24* (2013.01); *H04R 29/004* (2013.01); *H04R 2499/11* (2013.01)

(58) Field of Classification Search
CPC ....................................................... G10L 21/00
See application file for complete search history.

(56) References Cited

U.S. PATENT DOCUMENTS

| | | | | |
|---|---|---|---|---|
| 4,720,802 A | * | 1/1988 | Damoulakis | G10L 15/20 704/233 |
| 6,721,698 B1 | * | 4/2004 | Hariharan | G10L 15/02 704/203 |
| 8,131,543 B1 | * | 3/2012 | Weiss | G10L 25/78 704/210 |
| 8,600,743 B2 | * | 12/2013 | Lindahl | G10L 15/20 704/233 |
| 2002/0156622 A1 | * | 10/2002 | Hirsch | G10L 15/02 704/220 |
| 2008/0133234 A1 | * | 6/2008 | Ding | G10L 25/78 704/239 |
| 2008/0167868 A1 | * | 7/2008 | Kanevsky | G10L 15/20 704/233 |
| 2008/0240458 A1 | * | 10/2008 | Goldstein | H04R 25/453 381/72 |
| 2009/0191814 A1 | * | 7/2009 | Blu | G06F 17/10 455/63.1 |

(Continued)

FOREIGN PATENT DOCUMENTS

WO  WO-2013085499 A1  6/2013

OTHER PUBLICATIONS

Raychowdhury, Arijit, et al., "A 2.3nJ/frame Voice Activity Detector based audio front-end for context-aware System-on-Chip applications in 32nm CMOS", Custom Integrated Circuits Conference (CICC), IEEE, (Sep. 2012), 1-4.

*Primary Examiner* — Brian Albertalli
(74) *Attorney, Agent, or Firm* — Schwegman Lundberg & Woessner, P.A.

(57) ABSTRACT

An apparatus for adjusting a microphone sampling rate, the apparatus including an input to receive an audio signal from a microphone and a front-end processing module. The front-end processing module is to generate a plurality of frames from the audio signal received by the microphone, determine a noise profile using the plurality of frames, and adjust a sampling rate of the microphone based on the determined noise profile.

20 Claims, 8 Drawing Sheets

(56) References Cited

U.S. PATENT DOCUMENTS

| | | | | |
|---|---|---|---|---|
| 2011/0137656 A1* | 6/2011 | Xiang | ............... | G10L 25/78 704/270 |
| 2012/0303369 A1* | 11/2012 | Brush | ............... | G10L 17/02 704/246 |
| 2013/0223635 A1* | 8/2013 | Singer | ............... | H04R 1/1041 381/56 |
| 2014/0241546 A1* | 8/2014 | Matsumoto | ............... | H04R 3/04 381/86 |
| 2014/0257813 A1* | 9/2014 | Mortensen | ............... | G10L 15/02 704/251 |
| 2014/0278435 A1* | 9/2014 | Ganong, III | ............... | G10L 15/22 704/275 |
| 2014/0348345 A1* | 11/2014 | Furst | ............... | H04R 3/00 381/111 |
| 2015/0055803 A1* | 2/2015 | Qutub | ............... | H04R 3/00 381/111 |
| 2015/0063575 A1* | 3/2015 | Tan | ............... | G06F 17/30743 381/56 |
| 2015/0066498 A1* | 3/2015 | Ma | ............... | G10L 25/84 704/233 |
| 2015/0073795 A1* | 3/2015 | Tan | ............... | G10L 15/063 704/243 |

\* cited by examiner

|  | CLEAN | CAR-15 | CAR-10 | CAR-5 | CAR-0 | OUT-15 | OUT-10 | OUT-5 | OUT-0 | PUB-15 | PUB-10 | PUB-5 |
|---|---|---|---|---|---|---|---|---|---|---|---|---|
| BASELINE | 98.01 | 97.68 | 95.22 | 92.21 | 90.04 | 90.56 | 85.63 | 80.72 | 74.68 | 81.3 | 76.64 | 70.68 |
| HALF RATE | 96.11 | 96.29 | 91.18 | 82.98 | 87.16 | 88.79 | 74.51 | 71.52 | 59.63 | 65.45 | 63.29 | 61.85 |
| ADAPT | 96.37 | 95.72 | 94.43 | 92.21 | 90.05 | 89.19 | 85.63 | 80.72 | 74.68 | 81.3 | 76.64 | 70.68 |

*FIG. 6*

ADAPTIVE MICROPHONE SAMPLING RATE TECHNIQUES

TECHNICAL FIELD

Embodiments described herein generally relate to audio processing and, in particular, to voice recognition.

BACKGROUND

Voice command and continuous speech recognition can be important for mobile computing systems due to limited keyboard functionality. However, the power cost of continuously listening for potential voices in the environment may be so high that most systems require an input from the user before the systems can start listening. This approach may be inconvenient and may limit the practicality of many potential applications.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6 is a table comparing the accuracy for a full sampling rate, a half sampling rate, and an adaptive rate using various techniques of this disclosure for various noise conditions.

DETAILED DESCRIPTION

Figure 1:
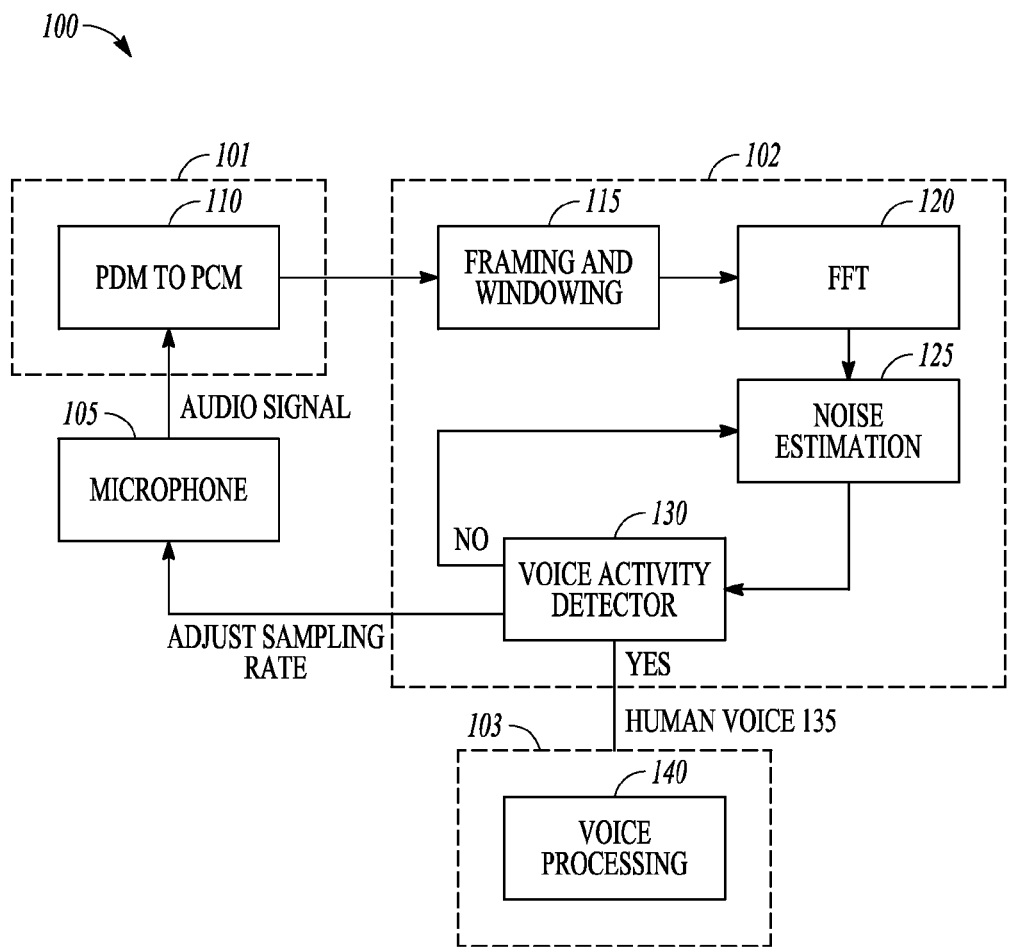
FIG. 1 is a block diagram that illustrates an example speech recognition system that may implement various techniques of this disclosure.

Voice activity detection allows a mobile device to continually listen for speech, which allows hands-free interaction without requiring a button press or other physical means of enabling the listening mode. For this model to be practical, however, it is desirable that the "always-on" listening mode be energy efficient so that battery life of the mobile device is not compromised.

The "always on" stage of a speech pipeline may include one or more microphones, an optional noise-cancellation stage, and a voice activity detector (VAD). The VAD acts as a gateway system that determines whether the rest of the speech pipeline should turn on. If the VAD determines that the sound samples are speech samples, then those samples are forwarded to other modules in the speech pipeline such as a keyword detector module, a speaker detector module, and a command and control module. Even though the keyword detector module, the speaker detector module, and the command and control module may have a higher complexity and active power than the simpler "always on" stages, they consume only a small portion of the average power due to the VAD acting as a gateway for the rest of the pipeline. Therefore, power reduction in the beginning stages may have a high impact on the total power consumed processing speech.

One power saving approach uses a low power VAD module that was designed to serve as a front-end to a software speech processing backend. The VAD module is capable of detecting speech while consuming as little as about 50 microwatts ($\mu W$) to about 100 $\mu W$ of power. Reducing the overhead of the VAD module so drastically, however, may aggrandize the presence of another module in the "always on" stage of the speech pipeline, namely the microphone. The input stage, including the microphone and interface circuitry, may consume as much to double (depending on whether one or two microphones are connected) as the average power as the rest of the speech pipeline put together.

Using the techniques of this disclosure, the power consumption of the microphone may be reduced by adaptively changing the sampling rate such that a lower sampling rate is used in low-noise conditions and a higher sampling rate is used in high-noise conditions. The term 'sampling rate' in this disclosure refers to the number of samples taken by the microphone per second from a continuous audio signal to make a discrete signal. As described in more detail below, the speech pipeline, e.g., the pre-processing module 101 of FIG. 1 described below, may determine a noise floor and compare the noise floor to a threshold. When the noise floor is low—as is the expected most common usage case—the microphone sampling rate may be reduced for significant power savings. Evaluation of this approach for four different noise types, described below with respect to FIG. 6, showed that the techniques of this disclosure may be able to differentiate between the low and high noise conditions and adapt to the lower sampling rate in cases where overall accuracy is not significantly degraded.

FIG. 1 is a block diagram that illustrates an example speech recognition system 100 that may implement various techniques of this disclosure. The system 100 may include a pre-processing module 101 configured to capture audio signal, a front-end processing module 102 configured to process the audio signal and detect any human voice information that may be included in the audio signal, and a backend processing module 103 configured to analyze the human voice information and perform operations associated with the human voice information. It may be noted that the audio signal may include background noise and the human voice information. The various techniques described below may be implemented in one or a combination of hardware, firmware, and software. Embodiments may also be implemented as instructions stored on a computer-readable storage device, which may be read and executed by at least one processor to perform the operations described herein.

A pre-processing module 101 may include an input configured to receive an audio signal from a microphone 105 that may be used to capture the audio signal as Pulse Density Modulation (PDM) information streams. A PDM stream may include audio signal in a digital format in time domain. The pre-processing module 101 may include a PDM to Pulse-code modulation (PCM) converter 110 configured to receive the PDM information streams and generate PCM information streams. The PCM information streams may be viewed as a digital representation of the PDM information streams. The PCM information streams include un-encoded or raw information. For some embodiments, the PCM data stream may be received directly. For example, the microphone 105 may include an integrated feature such that it generates the PCM information streams.

A front-end processing module 102 may include a framing and windowing module 115 configured to frame and window the PCM information streams received from the PDM-PCM converter 110. The framing and windowing module 115 may frame and window the PCM information streams into multiple frames based on a sampling rate and a frame size. For example, a sampling rate may be set at 16 kilohertz (kHz), and a frame size may be set at 32 milliseconds (ms). Depending on the implementation, a different sampling rate and a different frame size may be used. For some embodiments, the frames may overlap one another with a non-overlapping window. For example, two consecutive frames each having a frame size of 32 ms may overlap one another by 22 ms with a non-overlapping window of 10 ms. Using the 16 kHz sampling rate and the 32 ms frame size examples, the number of samples per frame may be 16×32=512.

A Fast Fourier Transform (FFT) module 120 may be configured to receive the frames of the PCM information streams and perform necessary transformation of those frames from their time domain representation into a frequency domain representation. The frequency-domain representation of the audio signal may indicate energy or signal levels within each given frequency band over a range of frequencies (illustrated in FIG. 2).

After the transformation operations are performed by the FFT module 120, a noise estimation module 125 may analyze each frame in the frequency domain representation and filter out any noise information that may not be within a same band as the human voice information. For some embodiments, the noise estimation module 125 may be implemented as a programmable band-pass filter. In general, the human voice may fall within a band approximately between 20 Hz and 7 kHz (referred to herein as a human voice band). The noise estimation module 125 may be configured to detect any energy or signal levels that may fall outside of the human voice band and suppress that energy as out-of-band energy.

There may be a difference between statistical properties of human voice and background noise. For some embodiments, the noise estimation module 125 may distinguish the human voice from the background noise based on an assumption that the human voice tends to be in a pattern of short bursts followed by pauses which may be illustrated as short burst of high amplitude energy followed by low amplitude energy. This energy pattern is different from the energy associated with background noise where the mean amplitude of the energy may tend to remain relatively the same or change very slowly from one period of time to another period of time. As a result, it may be possible to keep track and estimate the background noise over a period of time.

A VAD module 130 may be configured to use the background noise estimation to determine whether there is a presence of the human voice within the human voice band. For some embodiments, the VAD module 130 may determine the total energy within a frame in the frequency domain representation, compare that with the estimated noise energy, and determine whether there is a presence of the human voice within that frame. For example, when the total energy is larger than the background noise energy multiplied by a threshold, human voice information 135 may be present. When the total energy is approximately less than or equal to the background noise energy, the human voice information 135 may not be present. When the human voice information 135 is not present, the operations of the front-end processing module 102 may continue with the noise estimation and suppression of the next frame as performed by the noise estimation module 125.

The backend processing module 103 may include a voice processing module 140 configured to receive the human voice information 135 from the front-end processing module 102 and determine commands or instructions that may be included in the human voice information 135. The voice processing module 140 may cause operations to be performed based on the determined commands or instructions.

Using various techniques of this disclosure and as described in detail below, the front-end processing module 102 may determine a background noise floor, compare the noise floor to a threshold, e.g., a running average, and adaptively change the sampling rate of the microphone 105 based on the comparison. In this manner, significant power savings may be achieved by a device using an "always on" listening mode, e.g., a wireless communication device, such as a smartphone.

Figure 2:
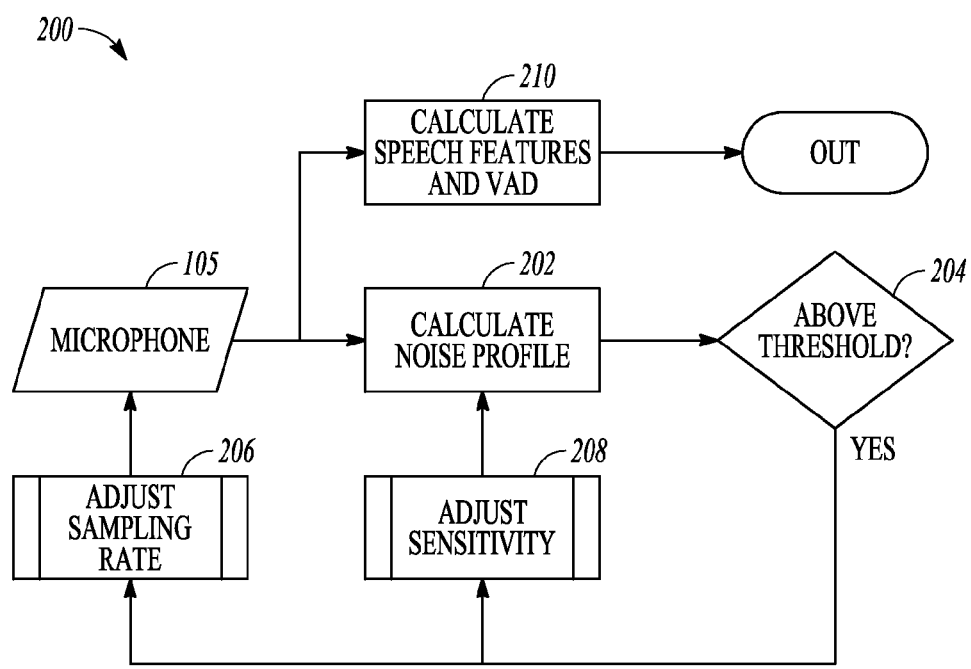
FIG. 2 is a flowchart illustrating a microphone sampling rate adaption heuristic, in accordance with this disclosure.

FIG. 2 is a flowchart illustrating a microphone sampling rate adaption heuristic 200, in accordance with this disclosure. A noise profile may be calculated at 202, e.g., by the noise estimation module 125 of FIG. 1, from a plurality of frames, e.g., as generated by the framing and windowing module 115 of FIG. 1. For example, the noise estimation module 125 may determine a noise profile by calculating a running average of the background noise.

If the calculated noise profile is determined to be above a threshold value ("YES" branch of 204), e.g., by the noise estimation module 125 of FIG. 1, the sampling rate of the microphone 105 may be adjusted at 206. For example, the VAD module 130 of FIG. 1 may compare the calculated noise profile to a threshold value and determine the sampling rate of the microphone 105 based on the comparison, e.g., increase from 4 kHz to 8 kHz. Then, the front-end processing module 102, e.g., the VAD module 130, may output a signal to the microphone 105 that increases its sampling rate, e.g., from 4 kHz to 8 kHz.

In addition, if the calculated noise profile is determined to be above a threshold value, e.g., by the noise estimation module 125 of FIG. 1, the sensitivity of the microphone 105 may be adjusted at 208. For example, the front-end processing module 102 may adjust one or more coefficients used by the noise estimation module 125 to calculate the noise profile at 202 based on the sampling rate.

If the calculated noise profile is determined to be below a threshold value, e.g., by the noise estimation module 125 of FIG. 1, the sampling rate of the microphone 105 may be adjusted at 206. For example, the noise estimation module 125 may compare the calculated noise profile to a threshold value and determine the sampling rate of a microphone based on the comparison, e.g., decrease from 8 kHz to 4 kHz. Then, the front-end processing module 102, e.g., the VAD module 130, may output a signal to the microphone that decreases its sampling rate, e.g., from 8 kHz to 4 kHz. Thus, the front-end processing module is configured to determine a sampling rate of the microphone based on the determined noise profile and adjust the sampling rate of the microphone 105 from a first sampling rate to a second sampling rate based on the determined noise profile.

Finally, speech features are calculated and voice activity detection is performed at 210. These functions may be performed by the front-end processing module 102 of FIG. 1. By adaptively changing the sampling rate of the microphone, power consumption may be greatly reduced.

Some microphones are able to dynamically trade-off between fidelity and power consumption. For example, the Knowles SPH0641LM4H Digital Zero-Height SiSonic™ Microphone is capable of adjusting its sampling rate by 15× (by programmatically adjusting its internal clock from 321 kHz to 4.8 MHz) to proportionally adjust its power consumption by as much as 5× (0.264 milliwatts (mW) to 1.32 mW). Although dynamically running at a low sampling rate may save a significant amount of power, existing speech pipeline designs do not dynamically adjust the sampling rates. Instead, existing speech pipelines choose to run at a higher and more stable sampling rate due to the fact that it may be difficult to achieve a high overall system accuracy otherwise. Not only is there the possibility that under-sampling as compared to the Nyquist rate may compromise the speech data, but also that adjacent frames sampled at different rates may become so aliased that they no longer appear continuous to the algorithms.

In accordance with this disclosure, the problems may be overcome by under-sampling the microphone during quiet conditions, where fidelity is least likely to be compromised, and then pseudo-up-sampling the audio frame in the VAD block algorithmically, during feature extraction. In this case, "pseudo-up-sampling" means to map and scale each point of the spectral energy of the under-sampled audio-frame back to the position it would hold in a fully sampled frame. This pseudo-up-sampling is described below with respect to FIG. 3.

Figure 3:
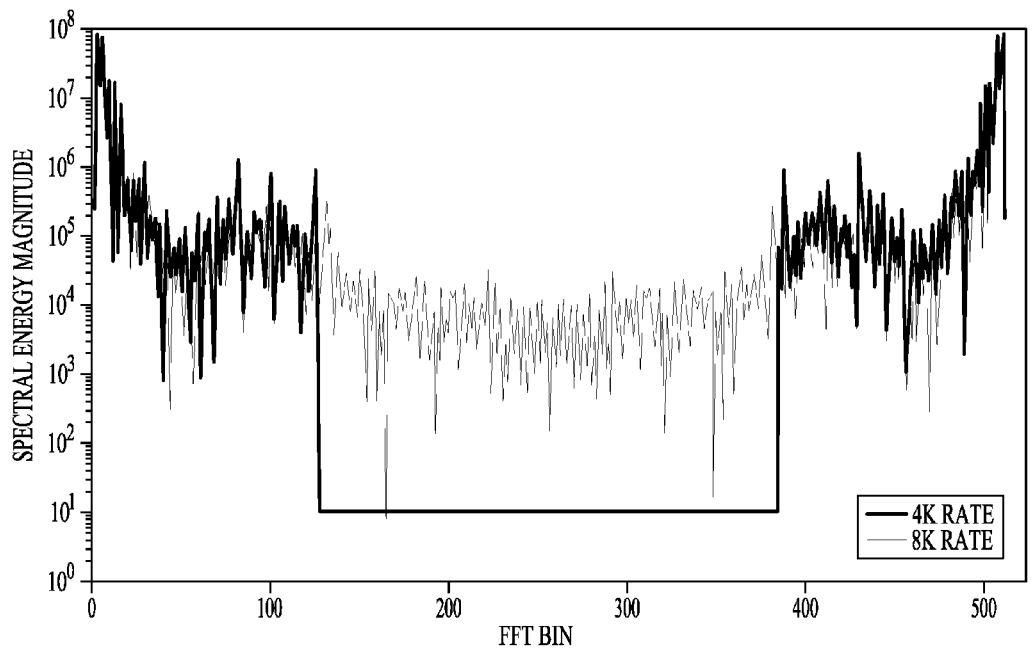
FIG. 3 is a graph illustrating the spectral energy of a speech frame for two different sampling rates.

FIG. 3 is a graph illustrating the spectral energy of a speech frame for two different sampling rates. In FIG. 3, the x-axis represents the FFT bin and the y-axis represents the magnitude of the spectral energy. FIG. 3 compares the spectral energy of an audio frame sampled at 8 kHz (gray) and also sampled at 4 kHz (superimposed on top, in black). The front-end processing module 102 may calculate a spectral energy representation based on the sampling rate. For example, the FFT module 120 may calculate the FFT of the audio frame, and then the front-end processing module 102 may calculate the spectral energy representation based on the squared magnitude of the FFT values. If an 8 kHz sampling rate uses a 512 point FFT, a 4 kHz sampling rate uses only a 256 point FFT, thereby saving power in the calculation.

The result of the 256 point FFT is then mapped to the positions that these values would have in the 512 point FFT. As seen in FIG. 3, the under-sampled low frequency (4 kHz sampling rate) points match fairly well. That is, bins 1-128 of the 4 kHz sampling rate map closely to bins 1-128 of the 8 kHz sampling rate, and bins 129-256 of the 4 kHz sampling rate map closely to bins 385-512 of the 8 kHz sampling rate. But, the lower bins 129-384 of the 4 kHz sampling rate are missing. These lower bins 129-384, however, contain a much lower energy, due to the fact that speech waveforms contain most of their energy in the lower end of the frequency spectrum. Thus, there is not much overall degradation of speech-energy information To summarize, using various techniques of this disclosure, the front-end processing module 102 may determine a spectral energy representation of each of a plurality of frames, where the spectral energy representation includes N-points, e.g., a 512-point FFT, when the sampling rate is a first sampling rate, e.g., 8 k sampling rate, and where the spectral energy representation includes M-points, e.g., a 256-point FFT, when the sampling rate is a second sampling rate that is less than the first sampling rate, and where M is less than N. Then, the front-end processing module 102 may map at least some of the M-points to the N-points when using the second sampling rate, prior to calculating at least one MFCC.

Because audio samples include a large amount data, many higher level speech blocks actually operate on "features" that represent a compressed, de-correlated version of the audio frame. The most commonly used audio features are MFCCs. In addition to the techniques described above, the present inventors have determined that Mel Frequency Cepstral Coefficients (MFCCs) may be used to mask differences in a variable sampling rate microphone, as described below with respect to FIG. 4.

Figure 4:
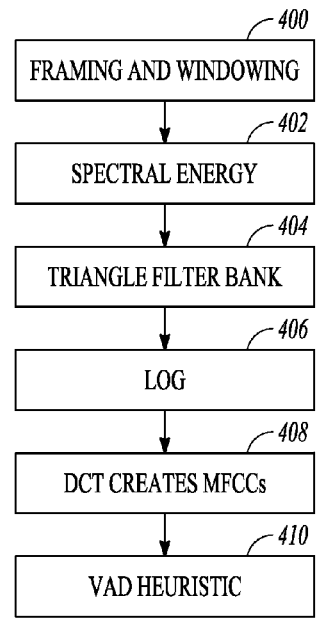
FIG. 4 is a flowchart for determining a VAD heuristic using Mel-frequency cepstral coefficients.

FIG. 4 is a flowchart for determining a VAD heuristic using Mel-frequency cepstral coefficients. First, the audio is framed and windowed, e.g., by the framing and windowing module 115 of the front-end processing module 102 (block 400) and then the spectral energy is calculated, e.g., by the FFT module 120 of the front-end processing module 102 (block 402). For example, the FFT module 120 may calculate the FFT of the audio frame, and then the front-end processing module 102 may calculate the spectral energy based on the squared magnitude of the FFT values.

Next, the spectral profile is filtered, e.g., by the noise estimation module 125 of the front-end processing module 102 (block 404), e.g., through a bank of logarithmically-sized triangle filters. In an example implementation, the output of the filter is a running average that represents the background noise level. This background noise level is the noise profile calculated at 202 in FIG. 2.

The filtered spectral profile may represent the energy in each different frequency bin. By tracking the bins over a period of time and calculating a running average, for example, a baseline noise floor, or noise profile, may be determined for those frequency bins.

The filtered spectral profile may then be normalized, e.g., by the noise estimation module 125 of the front-end processing module 102, e.g., by taking the logarithm (block 406). As mentioned above, "pseudo-up-sampling" may be used to map and scale each point of the spectral energy of the under-sampled audio-frame back to the position it would hold in a fully sampled frame. The "pseudo-up-sampling" may be performed prior to or after the logarithm is calculated at 406.

Next, the result may be de-correlated using a Discrete Cosine Transform (DCT), e.g., using the noise estimation module 125 of the front-end processing module 102 (block 408). Other transforms may be used instead of a DCT, such as an FFT. This result is the MFCCs, upon which the VAD module 130 decides the validity of speech, noise, or silence using a VAD heuristic algorithm (block 410). The VAD heuristic at block 410 in FIG. 4 is the used in the VAD calculation at 210 in FIG. 2.

In an example implementation, the VAD heuristic (block 410) may be a moving threshold value that adapts to the level of background noise. If the MFCC is above the threshold value, the VAD module 130 determines that the sound samples are speech samples and then those samples are forwarded to other modules in the speech pipeline such as a keyword detector module, a speaker detector module, and a command and control module. If the MFCC is below the threshold, the VAD module 130 determines that the sound samples are noise and portions of the speech pipeline may remain off, thereby saving power.

Basing the VAD heuristic (block 410) on the MFCCs instead of directly using the spectral energy profile as in existing approaches may be advantageous because the MFCCs are normalized and de-correlated from each other. This means that the first few MFCCs calculated at different sampling rates may not be all that different between different sampling rates because most of the speech information is located in the lower frequency level. Thus, a consistent voice-threshold can be calculated by the VAD heuristic (block 410). Although this may be generally true when speech energy makes up the vast majority of the total frame, when noise is present, the MFCCs may become too warped to meaningfully differentiate between speech and nonspeech, as shown and described below with respect to FIGS. 5A and 5B.

Figure 5A:
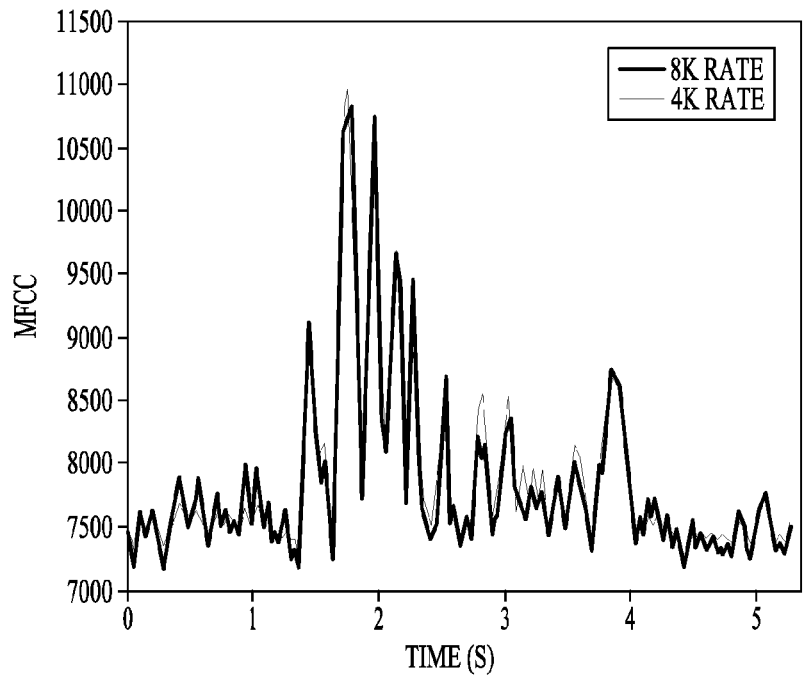
FIGS. 5A and 5B are graphs comparing the first MFCC of an audio sample for two different noise levels.
Figure 5B:
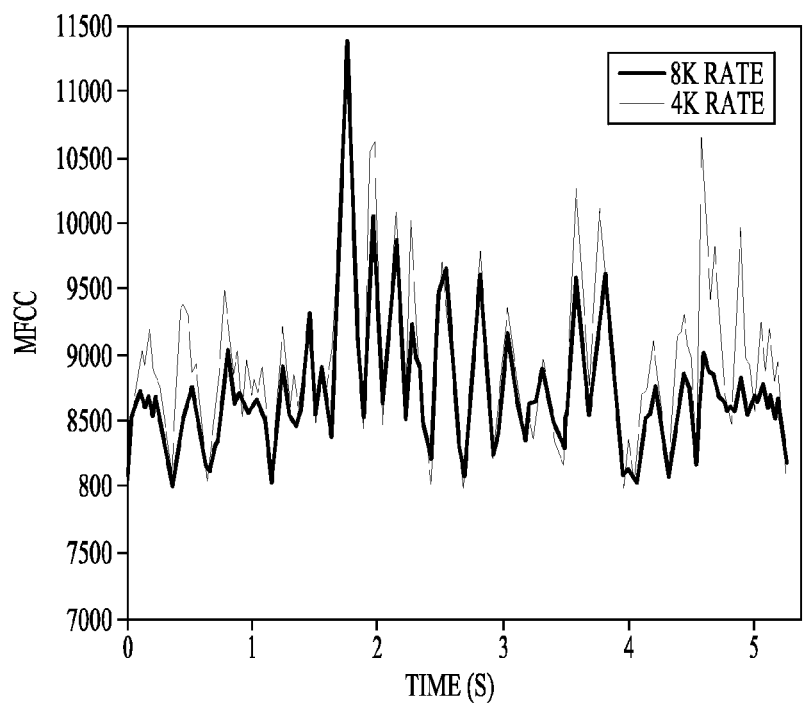

FIGS. 5A and 5B are graphs comparing the first MFCC of an audio sample for two different noise levels. In FIGS. 5A and 5B the x-axis represents time in seconds and the y-axis represents first MFCC values. In both FIGS. 5A and 5B, the utterance is roughly located between 1.75 seconds and 4 seconds.

FIG. 5A depicts the first MFCCs using an 8 kHz sampling rate and a 4 kHz sampling rate of an utterance in a car. The background noise level in a car is relatively low. As seen in FIG. 5A, there is a close match between the MFCCs at both sampling rates, e.g., between 0-1 second and between 4-5 seconds.

FIG. 5B depicts the first MFCCs using an 8 kHz sampling rate and a 4 kHz sampling rate of an utterance in a pub. The background noise level in a pub is relatively high. As seen in FIG. 5B, there is a poor match between the MFCCs at both sampling rates, e.g., between 0-1 second and between 4-5 seconds, due to the higher noise in the pub. Thus, in accordance with this disclosure, the full sampling rate, e.g., 8 kHz sampling rate, may be used when the background noise level is above an insignificant level.

As mentioned above, in an example implementation, the VAD heuristic may be a moving threshold that adapts to the level of background noise. As one non-limiting example, in FIG. 5A, the VAD heuristic may calculate a threshold of about 8000. In another non-limiting example, in FIG. 5B, the VAD heuristic may calculate a threshold of about 9250. These specific example thresholds are merely for purposes of illustration.

FIG. 6 is a table comparing the accuracy for a full sampling rate, a half sampling rate, and an adaptive rate using various techniques of this disclosure for various noise conditions. More particularly, FIG. 6 shows the results for an adaptive sampling rate for 4 different noise types (clean, car, outside, and pub) for a number of different noise levels. The full sampling rate ("Baseline") is a sampling rate of 8 kHz, the half sampling rate ("Halfrate") is a sampling rate of 4 kHz, and an adaptive sampling rate ("Adapt") switches between 8 kHz and 4 kHz and is basically active in the lowest noise levels (fully ON in "Clean" and "CAR-15", and partially ON in "CAR-10" and "OUT-15"), which is by far the most common condition. Using various techniques described above, the sampling rate of the microphone 105 is adaptive based on a heuristic that switches to the higher sampling rate whenever the global noise floor increases above a threshold.

While in the lower sampling rate, e.g., 4 kHz, as well as right after a transition between sampling rates, the sensitivity of the noise-floor tracking process (shown at 208 in FIG. 2) may be increased in order to ensure that onset of speech is captured at the higher rate as soon as possible and that it remains at the highest rate for the duration of the utterance. Thus, while the results for the half sampling rate are poor for higher noise levels, such as "OUT-0", "PUB-15", "PUB-10", and "PUB-5", the adaptive rate is able to match the full sampling rate while still being able to save half the power at the lower noise levels.

It should be noted that although the adaptive sampling rate techniques described above utilize a half sampling rate, in some example implementations, the sampling rate may be less than half the full sampling rate in low noise conditions. By utilizing a sampling rate that is less than half the full sampling rate, even more power savings may be achieved.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 500 may include one or more processors and may be configured with instructions stored on a computer-readable storage device.

Figure 7:
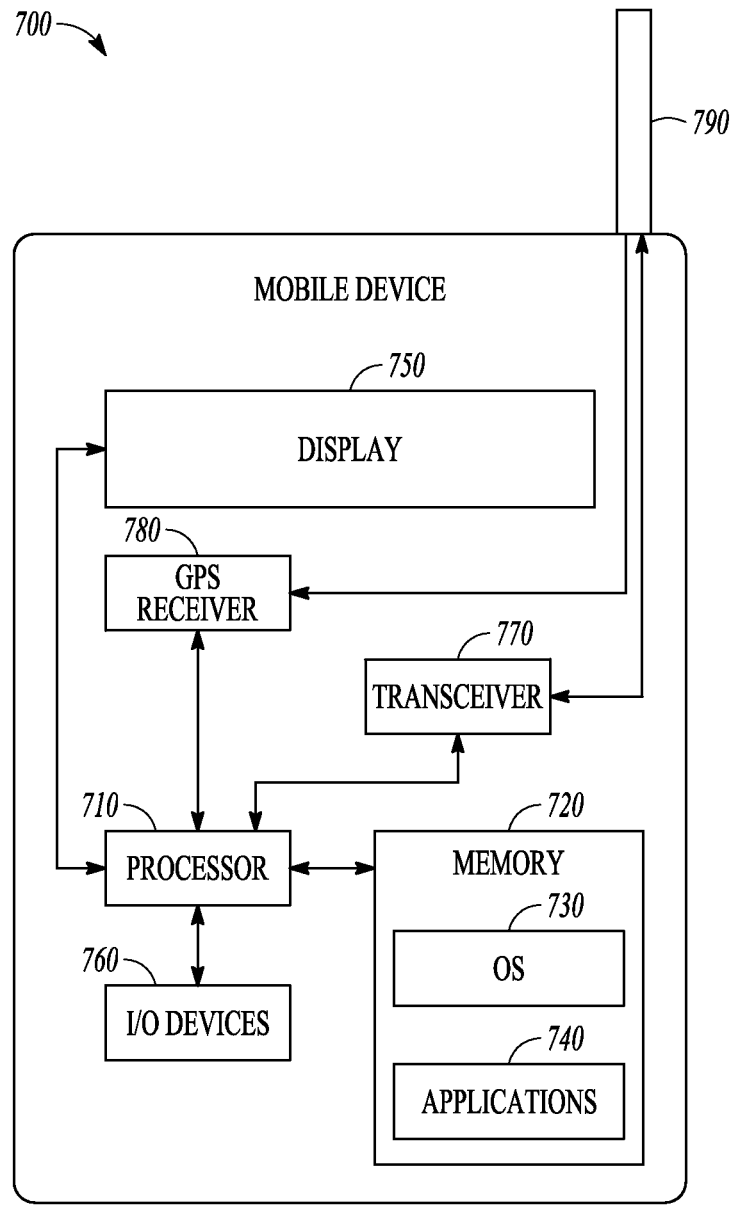
FIG. 7 is a block diagram illustrating a mobile device, upon which any one or more of the techniques described in this disclosure may be performed.

FIG. 7 is a block diagram illustrating a wireless communication device 700 (or mobile device), upon which any one or more of the techniques (e.g., methodologies) described in this disclosure may be performed. The mobile device 700 may include a processor 710. The processor 710 may be any of a variety of different types of commercially available processors suitable for mobile devices, for example, an XScale architecture microprocessor, a Microprocessor without Interlocked Pipeline Stages (MIPS) architecture processor, or another type of processor. A memory 720, such as a Random Access Memory (RAM), a Flash memory, or other type of memory, is typically accessible to the processor 710. The memory 720 may be adapted to store an operating system (OS) 730 as well as application programs 740. The OS 730 or application programs 740 may include instructions stored on a computer readable medium (e.g., memory 720) that may cause the processor 710 of the mobile device 700 to perform any one or more of the techniques described in this disclosure. The processor 710 may be coupled, either directly or via appropriate intermediary hardware, to a display 750 and to one or more input/output (I/O) devices 760, such as a keypad, a touch panel sensor, a microphone, etc. Similarly, in an example embodiment, the processor 710 may be coupled to a transceiver 770 that interfaces with an antenna 790. The transceiver 770 may be configured to both transmit and receive cellular network signals, wireless data signals, or other types of signals via the antenna 790, depending on the nature of the mobile device 700. Further, in some configurations, a GPS receiver 780 may also make use of the antenna 790 to receive GPS signals.

Figure 8:
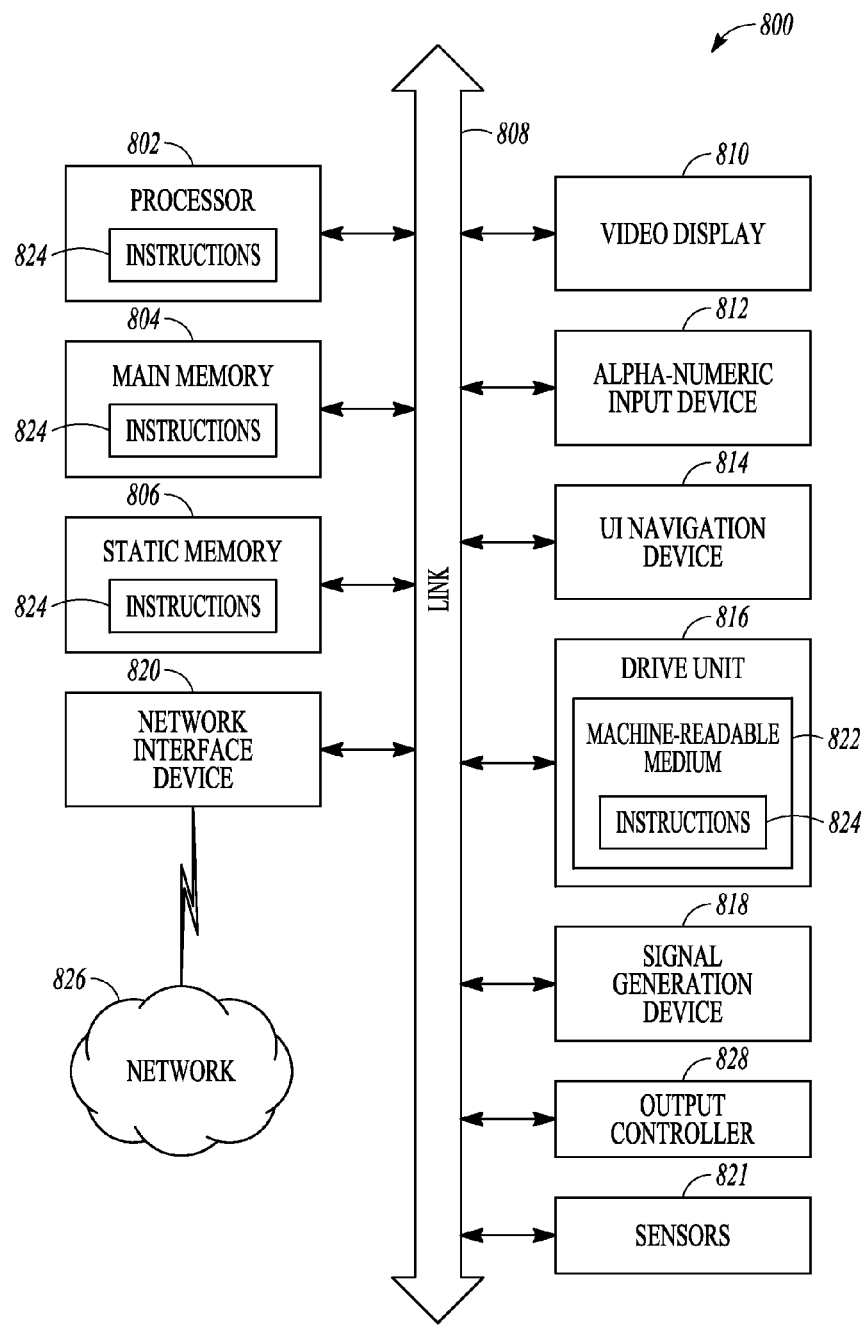
FIG. 8 is a block diagram of an example machine upon which any one or more of the techniques described in this disclosure may be performed.

FIG. 8 illustrates a block diagram of an example machine 800 upon which any one or more of the techniques (e.g., methodologies) described in this disclosure may be performed. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a Personal Digital Assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a processing unit, a graphics processing unit (GPU), a hardware processor core, or any combination thereof), a main memory 804, and a static memory 806, some or all of which may communicate with each other via a link 808 (e.g., a bus, link, interconnect, or the like). The machine 800 may further include a display device 810, an input device 812 (e.g., a keyboard), and a user interface (UI) navigation device 814 (e.g., a mouse). In an example, the display device 810, input device 812, and UI navigation device 814 may be a touch screen display. The machine 800 may additionally include a mass storage (e.g., drive unit) 816, a signal generation device 818 (e.g., a speaker), a network interface device 820, and one or more sensors 821, such as a global positioning system (GPS) sensor, camera, video recorder, compass, accelerometer, or other sensor. The machine 800 may include an output controller 828, such as a serial (e.g., universal serial bus (USB), parallel, or other wired or wireless (e.g., infrared (IR)) connection to communicate or control one or more peripheral devices (e.g., a printer, card reader, etc.)

The mass storage 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the mass storage 816 may constitute machine-readable media.

While the machine-readable medium 822 is illustrated as a single medium, the term "machine readable medium" may include a single medium or multiple media (e.g., a centralized or distributed database, and/or associated caches and servers) that configured to store the one or more instructions 824.

The term "machine-readable medium" may include any tangible medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). The term "transmission medium" shall be taken to include any intangible medium that is capable of storing, encoding or carrying instructions for execution by the machine 800, and includes digital or analog communications signals or other intangible medium to facilitate communication of such software.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Figure 9:
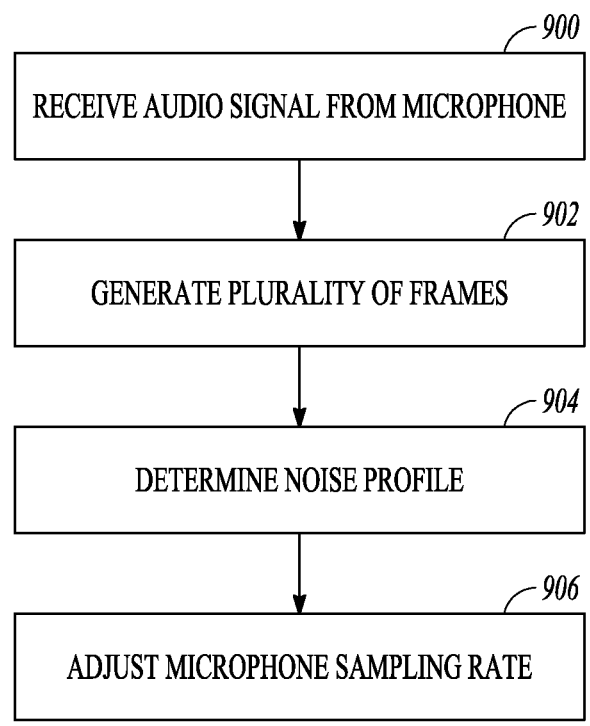
FIG. 9 is a flowchart illustrating an example method in accordance with this disclosure.

FIG. 9 is a flowchart illustrating an example method in accordance with this disclosure. In the example method shown in FIG. 9, the pre-processing module 101, for example, receives an audio signal from the microphone 105 (900). The front-end processing module 102 generates a plurality of frames (902), e.g., using framing and windowing module 115. The front-end processing module 102 determines a noise profile of the frames (904), e.g., using noise estimation module 102. Then, sampling rate of the microphone 105 is adjusted based on the noise profile (906). For example, if the determined noise profile is below a threshold, the sampling rate of the microphone 105 may be decreased and if the determined noise profile is above a threshold, the sampling rate of the microphone 105 may be increased.

In addition, the method of FIG. 9 may also include calculating at least one Mel-frequency cepstral coefficient (MFCC) for each of the plurality of frames and detecting a presence of a human voice based on the at least one MFCC.

The method of FIG. 9 may also include determining a spectral energy representation of each of the plurality of frames, where the spectral energy representation includes N-points when the sampling rate is a first sampling rate, where the spectral energy representation includes M-points when the sampling rate is a second sampling rate that is less than the first sampling rate, where M is less than N, and mapping and scaling at least some of the M-points to the N-points when using the second sampling rate, prior to calculating the at least one MFCC.

Example 1 includes subject matter (such as a device, apparatus, or machine) comprising an input to receive an audio signal from a microphone; and a front-end processing module to: generate a plurality of frames from the audio signal received by the microphone; determine a noise profile using the plurality of frames; and adjust a sampling rate of the microphone based on the determined noise profile.

In Example 2, the subject matter of Example 1 may include, wherein the front-end processing module is to: calculate at least one Mel-frequency cepstral coefficient (MFCC) for each of the plurality of frames; and detect a presence of a human voice based on the at least one MFCC.

In Example 3, the subject matter of any one or more of Examples 1 to 2 may include, wherein the front-end processing module is to detect a presence of a human voice based on the at least one MFCC and the noise profile is configured to: detect a presence of the human voice when the at least one MFCC is above a threshold value.

In Example 4, the subject matter of any one or more of Examples 1 to 3 may include, wherein to adjust the sampling rate of the microphone based on the determined noise profile, the front-end processing module is to adjust the sampling rate of the microphone from a first sampling rate to a second sampling rate based on the determined noise profile.

In Example 5, the subject matter of any one or more of Examples 1 to 4 may include, wherein the first sampling rate is higher than the second sampling rate, and wherein the front-end processing module is to adjust the sampling rate of the microphone from the first sampling rate to the second sampling rate when the determined noise profile is below a threshold.

In Example 6, the subject matter of any one or more of Examples 1 to 5 may include, wherein the front-end processing module is to: determine a spectral energy representation of each of the plurality of frames, the spectral energy representation including N-points when the sampling rate is a first sampling rate, the spectral energy representation including M-points when the sampling rate is a second sampling rate that is less than the first sampling rate, where M is less than N; and map and scale at least some of the M-points to the N-points when using the second sampling rate, prior to calculating the at least one MFCC.

In Example 7, the subject matter of any one or more of Examples 1 to 6 may include, wherein the front-end processing module includes a Fast Fourier Transform (FFT) module to perform an FFT on each of the plurality of frames, wherein the spectral energy representation that includes N-points when the sampling rate is a first sampling rate includes a 512-point FFT; wherein the spectral energy representation that includes M-points when the sampling rate is a second sampling rate includes a 256-point FFT; and wherein the front-end processing module configured to map and scale at least some of the M-points to the N-points when using the second sampling rate, prior to calculating the at least on MFCC is to: map points 1 through 128 of the 256-point FFT to points 1 through 128 of the 512-point FFT, respectively, prior to calculating the at least one MFCC, and map points 129 through 256 of the 256-point FFT to points 385 through 512 of the 512-point FFT, respectively, prior to calculating the at least one MFCC.

In Example 8, the subject matter of any one or more of Examples 1 to 7 may include, wherein the first sampling rate is about 8 kilohertz (kHz) and the second sampling rate is about 4 kHz.

In Example 9, the subject matter of any one or more of Examples 1 to 8 may include, wherein to determine the noise profile using the plurality of frames, the front-end processing module is to determine the noise profile based on a running average.

In Example 10, the subject matter of any one or more of Examples 1 to 9 may include, wherein the front-end processing module is to: determine the noise profile using at least one of a plurality of coefficients; and adjust the at least one of the plurality of coefficients based on the determined sampling rate.

Example 11 includes or may optionally be combined with the subject matter of any one or more of Examples 1 to 10 to include subject matter for adjusting a microphone sampling rate (such as a method, means for performing acts, machine readable medium including instructions that when performed by a machine cause the machine to performs acts, or an apparatus configured to perform) comprising: receiving an audio signal from a microphone; generating a plurality of frames from the audio signal received by the microphone; determining a noise profile using the plurality of frames; and adjusting a sampling rate of the microphone based on the determined noise profile.

In Example 12, the subject matter of Example 11 may optionally include, calculating at least one Mel-frequency cepstral coefficient (MFCC) for each of the plurality of frames; and detecting a presence of a human voice based on the at least one MFCC.

In Example 13, the subject matter of any one or more of Examples 11 to 12 may optionally include, wherein detecting a presence of a human voice based on the at least one MFCC includes: detecting a presence of a human voice when the at least one MFCC is above a threshold value.

In Example 14, the subject matter of any one or more of Examples 11 to 13 may optionally include, adjusting the sampling rate of the microphone from a first sampling rate to a second sampling rate based on the determined noise profile.

In Example 15, the subject matter of any one or more of Examples 11 to 14 may optionally include, wherein the first sampling rate is higher than the second sampling rate, the method comprising: adjusting the sampling rate of the microphone from the first sampling rate to the second sampling rate when the determined noise profile is below a threshold.

In Example 16, the subject matter of any one or more of Examples 11 to 15 may optionally include, determining a spectral energy representation of each of the plurality of frames, wherein the spectral energy representation includes N-points when the sampling rate is a first sampling rate, wherein the spectral energy representation includes M-points when the sampling rate is a second sampling rate that is less than the first sampling rate, where M is less than N; and mapping and scaling at least some of the M-points to the N-points when using the second sampling rate, prior to calculating the at least one MFCC.

In Example 17, the subject matter of any one or more of Examples 11 to 16 may optionally include, performing a Fast Fourier Transform (FFT) on each of the plurality of frames, wherein the spectral energy representation that includes N-points when the sampling rate is a first sampling rate includes a 512-point FFT; wherein the spectral energy representation that includes M-points when the sampling rate is a second sampling rate includes a 256-point FFT; and wherein mapping and scaling at least some of the M-points to the N-points when using the second sampling rate, prior to calculating the at least on MFCC includes: mapping and scaling points 1 through 128 of the 256-point FFT to points 1 through 128 of the 512-point FFT, respectively, prior to calculating the at least one MFCC, and mapping and scaling points 129 through 256 of the 256-point FFT to points 385 through 512 of the 512-point FFT, respectively, prior to calculating the at least one MFCC.

In Example 18, the subject matter of any one or more of Examples 11 to 17 may optionally include, wherein the first sampling rate is about 8 kilohertz (kHz) and the second sampling rate is about 4 kHz.

In Example 19, the subject matter of any one or more of Examples 11 to 18 may optionally include, wherein determining a noise profile using the plurality of frames includes determining the noise profile based on a running average.

In Example 20, the subject matter of any one or more of Examples 11 to 19 may optionally include, determining the noise profile using at least one of a plurality of coefficients; and adjusting the at least one of the plurality of coefficients based on the determined sampling rate.

Example 21 includes or may optionally be combined with the subject matter of any one of Examples 1-20 to include an apparatus comprising means for performing any of the Examples 1-20.

Example 22 includes an apparatus comprising means for receiving an audio signal from a microphone; means for generating a plurality of frames from the audio signal received by the microphone; means for determining a noise profile using the plurality of frames; and means for adjusting a sampling rate of the microphone based on the determined noise profile.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus for adjusting a microphone sampling rate, the apparatus comprising:
    an input to receive an audio signal from a microphone; and
    a front-end processing module to:
        generate a plurality of frames from the audio signal received by the microphone;
        determine a spectral energy representation of each of the plurality of frames, the spectral energy representation including N-points when the microphone sampling rate of is a first sampling rate, the spectral energy representation including M-points when the sampling rate is a second sampling rate that is less than the first sampling rate, where M is less than N;
        map and scale at least some of the M-points to the N-points when using the second sampling rate, prior to calculating at least one Mel-frequency cepstral coefficient (MFCC);
        determine a noise profile using the plurality of frames;
        adjust the sampling rate of the microphone based on the determined noise profile;
        calculate the at least one MFCC for each of the plurality of frames; and
        detect a presence of a human voice based on the at least one MFCC.

2. The apparatus of claim 1, wherein the front-end processing module is to detect a presence of a human voice based on the at least one MFCC is configured to:
    detect a presence of the human voice when the at least one MFCC is above a threshold value.

3. The apparatus of claim 1, wherein to adjust the sampling rate of the microphone based on the determined noise profile, the front-end processing module is to adjust the sampling rate of the microphone from the first sampling rate to the second sampling rate based on the determined noise profile.

4. The apparatus of claim 3, wherein the front-end processing module is to adjust the sampling rate of the microphone from the first sampling rate to the second sampling rate when the determined noise profile is below a threshold.

5. The apparatus of claim 1, wherein the front-end processing module includes a Fast Fourier Transform (FFT) module to perform an FFT on each of the plurality of frames,
    wherein the spectral energy representation that includes N-points when the sampling rate is a first sampling rate includes a 512-point FFT;
    wherein the spectral energy representation that includes M-points when the sampling rate is a second sampling rate includes a 256-point FFT; and
    wherein the front-end processing module configured to map and scale at least some of the M-points to the N-points when using the second sampling rate, prior to calculating the at least one MFCC is to:
        map points 1 through 128 of the 256-point FFT to points 1 through 128 of the 512-point FFT, respectively, prior to calculating the at least one MFCC, and
        map points 129 through 256 of the 256-point FFT to points 385 through 512 of the 512-point FFT, respectively, prior to calculating the at least one MFCC.

6. The apparatus of claim 1, wherein the first sampling rate is about 8 kilohertz (kHz) and the second sampling rate is about 4 kHz.

7. The apparatus of claim 1, wherein to determine the noise profile using the plurality of frames, the front-end processing module is to determine the noise profile based on a running average.

8. The apparatus of claim 1, wherein the front-end processing module is to:
    determine the noise profile using at least one of a plurality of coefficients; and
    adjust the at least one of the plurality of coefficients based on the determined sampling rate.

9. A method for adjusting a microphone sampling rate, the method comprising:
    receiving an audio signal from a microphone;
    generating a plurality of frames from the audio signal received by the microphone;
    determining a spectral energy representation of each of the plurality of frames, wherein the spectral energy representation includes N-points when the microphone sampling rate is a first sampling rate, wherein the spectral energy representation includes M-points when the sampling rate is a second sampling rate that is less than the first sampling rate, where M is less than N;

mapping and scaling at least some of the M-points to the N-points when using the second sampling rate, prior to calculating at least one Mel-frequency cepstral coefficient (MFCC);

determining a noise profile using the plurality of frames;

adjusting the sampling rate of the microphone based on the determined noise profile;

calculating the at least one MFCC for each of the plurality of frames; and detecting a presence of a human voice based on the at least one MFCC.

10. The method of claim 9, wherein detecting a presence of a human voice based on the at least one MFCC includes:

detecting a presence of a human voice when the at least one MFCC is above a threshold value.

11. The method of claim 9, wherein adjusting the sampling rate of the microphone based on the determined noise profile includes:

adjusting the sampling rate of the microphone from the first sampling rate to the second sampling rate based on the determined noise profile.

12. The method of claim 11, comprising:

adjusting the sampling rate of the microphone from the first sampling rate to the second sampling rate when the determined noise profile is below a threshold.

13. The method of claim 9, further comprising:

performing a Fast Fourier Transform (FFT) on each of the plurality of frames, wherein the spectral energy representation that includes N-points when the sampling rate is a first sampling rate includes a 512-point FFT;

wherein the spectral energy representation that includes M-points when the sampling rate is a second sampling rate includes a 256-point FFT; and wherein mapping and scaling at least some of the M-points to the N-points when using the second sampling rate, prior to calculating the at least one MFCC includes:

mapping and scaling points 1 through 128 of the 256-point FFT to points 1 through 128 of the 512-point FFT, respectively, prior to calculating the at least one MFCC, and mapping and scaling points 129 through 256 of the 256-point FFT to points 385 through 512 of the 512-point FFT, respectively, prior to calculating the at least one MFCC.

14. The method of claim 9, wherein the first sampling rate is about 8 kilohertz (kHz) and the second sampling rate is about 4 kHz.

15. The method of claim 9, wherein determining a noise profile using the plurality of frames includes determining the noise profile based on a running average.

16. The method of claim 9, further comprising:

determining the noise profile using at least one of a plurality of coefficients; and adjusting the at least one of the plurality of coefficients based on the determined sampling rate.

17. A machine-readable medium including instructions for adjusting a microphone sampling rate, which when executed by a processor, cause the processor to perform operations comprising:

receiving an audio signal from a microphone;

generating a plurality of frames from the audio signal received by the microphone;

determining a spectral energy representation of each of the plurality of frames, wherein the spectral energy representation includes N-points when a sampling rate of the microphone is a first sampling rate, wherein the spectral energy representation includes M-points when the sampling rate is a second sampling rate that is less than the first sampling rate, where M is less than N;

mapping and scaling at least some of the M-points to the N-points when using the second sampling rate, prior to calculating at least one Mel-frequency cepstral coefficient (MFCC);

determining a noise profile using the plurality of frames;

adjusting the sampling rate of the microphone based on the determined noise profile;

calculating the at least one MFCC for each of the plurality of frames; and detecting a presence of a human voice based on the at least one MFCC.

18. The machine-readable medium of claim 17, wherein detecting a presence of a human voice based on the at least one MFCC includes:

detecting a presence of a human voice when the at least one MFCC is above a threshold value.

19. The machine-readable medium of claim 17, wherein adjusting the sampling rate of the microphone based on the determined noise profile includes:

adjusting the sampling rate of the microphone from the first sampling rate to the second sampling rate based on the determined noise profile.

20. The machine-readable medium of claim 19, the operations comprising:

adjusting the sampling rate of the microphone from the first sampling rate to the second sampling rate when the determined noise profile is below a threshold.

* * * * *